United States Patent
Guler et al.

(10) Patent No.: US 11,520,105 B2
(45) Date of Patent: Dec. 6, 2022

(54) SINGLE PHOTON SOURCE

(71) Applicant: PURDUE RESEARCH FOUNDATION, West Lafayette, IN (US)

(72) Inventors: Urcan Guler, West Lafayette, IN (US); Alexander V Kildishev, West Lafayette, IN (US); Vladimir M Shalaev, West Lafayette, IN (US); Alexei S. Lagutchev, West Lafayette, IN (US); Andrey N. Smolyaninov, Chimki (RU)

(73) Assignee: Purdue Research Foundation, West Lafayette, IN (US)

( * ) Notice: Subject to any disclaimer, the term of this patent is extended or adjusted under 35 U.S.C. 154(b) by 1424 days.

(21) Appl. No.: 14/934,097

(22) Filed: Nov. 5, 2015

(65) Prior Publication Data
US 2017/0269300 A1    Sep. 21, 2017

Related U.S. Application Data

(60) Provisional application No. 62/075,452, filed on Nov. 5, 2014.

(51) Int. Cl.
G02B 6/122    (2006.01)
B82Y 20/00    (2011.01)

(52) U.S. Cl.
CPC ............ G02B 6/1226 (2013.01); B82Y 20/00 (2013.01); *Y10S 977/701* (2013.01); *Y10S 977/949* (2013.01); *Y10S 977/95* (2013.01)

(58) Field of Classification Search
CPC ...... G02B 6/1226; C09K 11/65; B82Y 20/00; Y10S 977/701; Y10S 977/949; Y10S 977/95
See application file for complete search history.

(56) References Cited

U.S. PATENT DOCUMENTS

2013/0056704 A1 * 3/2013 Shalaev ................ H04B 10/70
                                                     977/950
2015/0285953 A1 * 10/2015 Naik ...................... G02B 5/008
                                                     977/761

OTHER PUBLICATIONS

Aharonovich, I. et al., Diamond-based single-photon emitters. Rep. Prog. Phys., 74, 076501 (2011), 28 pages.
Shalaginov, M. Y. et al., Broadband enhancement of spontaneous emission from nitrogen-vacancy centers in nanodiamonds by hyperbolic metamaterials. Appl. Phys. Lett. 102, 173114 (2013), 4 pages.

* cited by examiner

*Primary Examiner* — Michael Carter
(74) *Attorney, Agent, or Firm* — Purdue Research Foundation

(57) ABSTRACT

The invention related to single photon emission systems based on nano-diamonds. Single-photon sources have a broad range of applications in quantum communication, quantum computing and quantum metrology.

7 Claims, 2 Drawing Sheets

SINGLE PHOTON SOURCE

REFERENCE TO RELATED APPLICATIONS

The present application claims priority to U.S. provisional application No. 62/075,452 filed Nov. 5, 2014.

FIELD OF INVENTION

The invention related to single photon emission systems. Single-photon sources have a broad range of applications in quantum communication, quantum computing and quantum metrology.

BACKGROUND OF THE INVENTION

A single photon source can be defined as a light source that produces photons that are separated in time. This emission of photons separated in time is also known as photon antibunching. Nano-diamonds can be used as an emitter for single photon sources. Color centers in nano-diamonds are prominent candidates to generate and manipulate quantum states of light, as they are a photostable solid-state source of single photons at room temperature and a very stable molecular configuration [See, for example, I Aharonovich, S Castelletto, D A Simpson, C-H Su, A D Greentree & S Prawer. "Diamond-based single-photon emitters", IOP publishing, pp. 1-4]. As color centers are spatially separated in a rigid diamond structure and exhibit sufficient brightness, they can be addressed individually by an excitation laser. Out of more than 500 color centers only 10 have been identified as bright, stable single photon emitters that have demonstrated antibunching characteristics.

Single photon emission systems are used in secure data transmission in quantum communication systems to prevent an unauthorized access to the data. The data is transmitted in a form of pulses of single photons.

SUMMARY

The present invention comprises a metal/insulator/metal waveguide system for the enhancement of single photon emission from nano-diamonds.

In some aspects, the waveguide system is supported with plasmonic nanostructures for improved or new functionalities such as spectrally selective or directional reflection and transmission.

In some aspects, the waveguide system is supported with high refractive index dielectric nanostructure arrays for improved or new functionalities such as spectrally selective or directional reflection and transmission.

In some aspects, the properties of the plasmonic or dielectric nanostructures are modulated via electronic or optical methods for dynamic tuning of functions described above.

In some aspects, the nano-diamond particles are spatially distributed over a lithographically patterned array via chemical or electrostatic bonding.

BRIEF DESCRIPTION OF DRAWINGS

FIG. 1(a-c) shows lithographic patterning of a polymer on top of a plasmonic thin film. FIG. 1(e-g) shows a slightly different scenario where the surface functionalization is done before polymer coating.

DETAILED DESCRIPTION OF THE PREFERRED EMBODIMENT

A colloidal assembly of a nanodiamond combined with a surface functions as substrate/nanoparticle system. A lithographic patterning is used for controlled staging of the nanodiamond. A surface functionalization is achieved by surfactants with different functional groups at the boundary of substrate and particles. The attachment is of chemical or electrostatic nature.

Figure 1:
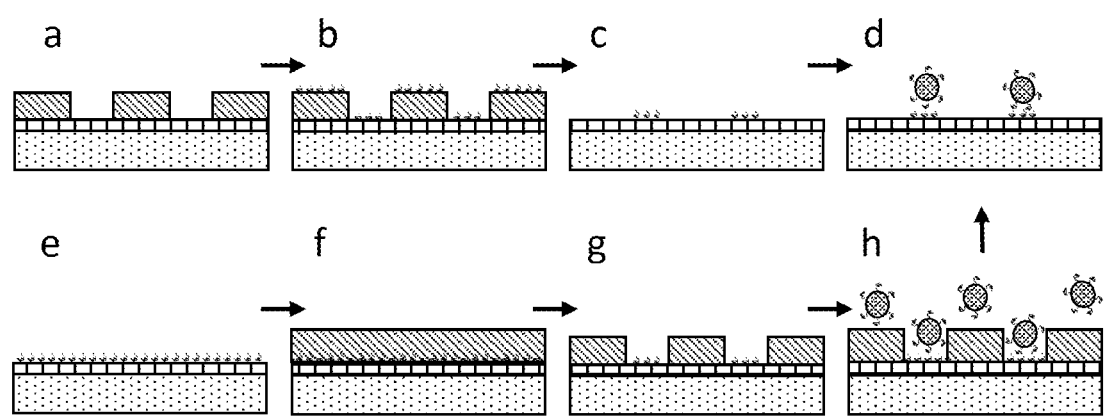
FIG. 1 illustrates ordered assembly of nanoparticles via surface functionalization of lithographically assigned nano-diamond sites.

FIG. 1 illustrates ordered assembly of nanoparticles via surface functionalization of lithographically assigned nano-diamond sites. Among many scenarios, two of the exemplary procedures are given for illustrative purposes. FIG. 1(a-c) shows lithographic patterning of a polymer on top of a plasmonic thin film. Functionalization of the top surfaces of the metallic film and the polymer and subsequent removal of the polymer leaving functionalized sites on the plasmonic surface. The nanodiamond with functionalized surface is then selectively targeted to the patterned sites. FIG. 1(e-g) shows a slightly different scenario where the surface functionalization is done before polymer coating. Then, polymer is coated over the functionalized substrate and patterned with lithographic methods. In this embodiment, the polymer surface remains bare without surfactants. FIG. 1h shows the attachment of the nanodiamond to the functionalized sites on the metallic film. Removal of the polymer leads to the patterned nanodiamond assembly as illustrated in FIG. 1(d). The spatial distribution of nanoparticles can be designed for efficient collective response and the pattern can be realized via lithographic methods including but not limited to photolithography, electron beam lithography, nanoimprint lithography, and soft lithography techniques together with roll-to-roll processing for large scale manufacturing.

Figure 2:
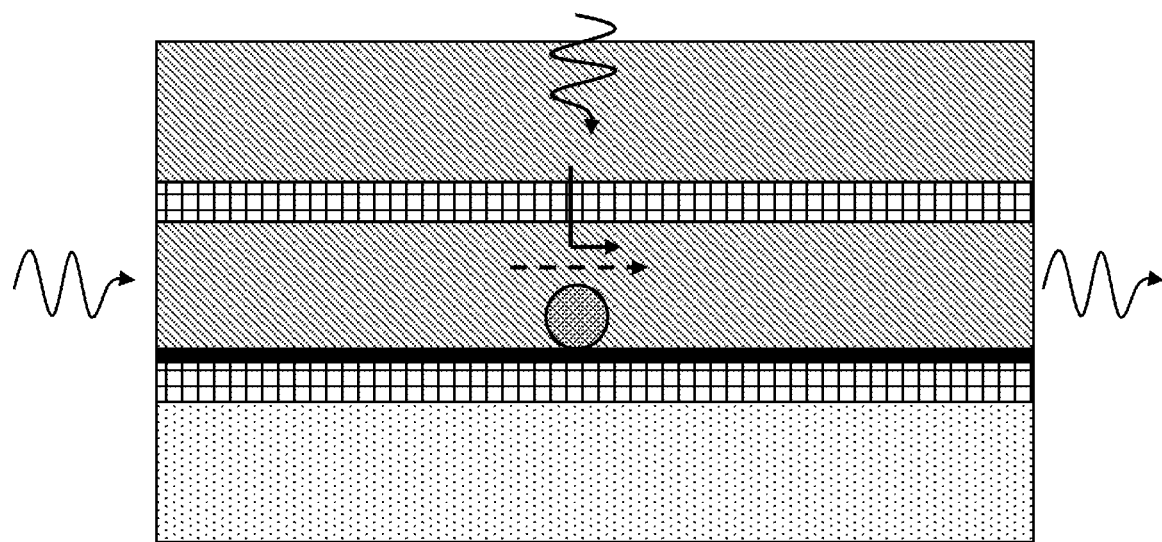
FIG. 2 shows light coupling from the top or bottom of the substrate.

Coupling of an electromagnetic wave to the nanodiamond is achieved via several variations of routines. One of the methods described here is the design of a metal/insulator/metal waveguide structure encapsulating the nanoparticle. FIG. 2 illustrates a structure designed that allows easy fabrication steps. A metallic thin film is deposited on a substrate, it is further modified by plasmonic or high index dielectric nanostructures that can be either one of arrayed nanoantennae structures or a set of nanostructures designed as metasurfaces with multiple functionalities such as spectral selectivity, directional reflection or transmission, and field confinement. The metasurface properties can be modulated via electronic or optical methods for dynamic tuning of one or more of the functions mentioned above. The particle is placed on top of the nanostructured thin film via the methods described in FIG. 1. A dielectric material is deposited on top of the nanoparticle. A simple modification to the method is performed by depositing a thinner layer (which is a half of the total dielectric layer thickness) of dielectric film before the staging of the nanodiamond. The rest of the dielectric layer can be further deposited and encapsulated in the dielectric layer. The thicknesses of the first and second dielectric layers is used for aligning the particle vertically. After the particle is covered by the dielectric layer, another metallic thin film is deposited in order to achieve a metal/insulator/metal waveguide structure for specific wavelengths and modes. In this design, light coupled into the waveguide structure efficiently couples to the nanoparticle and further improvement or multifunctionalities is added by the use of plasmonic or high index dielectric nanostructures.

The scheme described in FIG. 2 is also designed for light coupling from the top or bottom of the substrate. In this case, metallic thin film on the excitation side is designed thinner in order to achieve high pump incoupling efficiencies while the nanostructured back thin film is designed for directing the emitted photons into one direction of the waveguide. In this method, incoupling is enhanced by using an optical diode surface that allows high transmission in one direction and high reflection in the other. It is also possible to design the incoupling surface a spectrally selective layer that allows high transmittance for pump wavelengths and high reflection for emitted photon wavelengths.

In this design, it is possible to increase the pump coupling efficiency or emitted photon efficiency by means of parameters including but not limited to the metallic or dielectric materials, layer thicknesses, light wavelengths, nanostructure shapes and dimensions etc.

Figure 3:
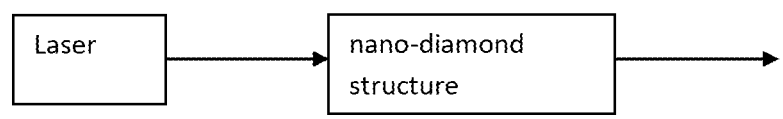
FIG. 3 shows schematically the nano-diamond structure excitation by a high power laser.

FIG. 3 shows schematically the nano-diamond structure excitation by a high power laser.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalent.

What is claimed is:

1. A single photon emitter, comprising:
   a first metallic thin film being deposited on a substrate, the first metallic thin film being further modified by plasmonic or high index dielectric nanostructures, further comprising a nanodiamond particle placed on top of the nanostructured thin film;
   a dielectric material being deposited on top of the nano-diamond particle, and a second metallic thin film is deposited in order to achieve a metal/insulator/metal waveguide structure for specific wavelengths and modes.

2. The single photon emitter of claim 1, further comprising:
   a laser emitting radiation which incouples to the nano-diamond particle;
   the emitter outputting a single photon light.

3. The single photon emitter of claim 2, wherein the nanostructured thin film is designed for directing emitted photons into one direction of a waveguide.

4. The single photon emitter of claim 2, wherein the metallic thin film on an excitation side is designed thinner in order to achieve a high laser pump incoupling efficiency.

5. The single photon emitter of claim 4, wherein incoupling is enhanced by using an optical diode surface that allows high transmission in one direction and high reflection in another direction.

6. The single photon emitter of claim 4, wherein an incoupling surface is a spectrally selective layer that allows high transmittance for laser pump wavelengths and high reflection for emitted photon wavelengths.

7. The single photon emitter of claim 1, wherein the dielectric layer comprises two parts;
   a first part being about a half of the total dielectric layer thickness is deposited prior to coupling of the nano-diamond particle, while a second part is deposited after coupling of the nanodiamond particle.

* * * * *